United States Patent [19]

Braathen

[11] 4,253,536

[45] Mar. 3, 1981

[54] ARTICULATED, CROSS-COUNTRY VEHICLE

[76] Inventor: Thor F. Braathen, N-3358 Nedre Eggedal, Norway

[21] Appl. No.: 14,560

[22] Filed: Feb. 23, 1979

[30] Foreign Application Priority Data

Feb. 28, 1978 [NO] Norway .................................. 780692

[51] Int. Cl.³ .......................... B60D 7/00; B60P 1/04; B60P 1/16; B62D 55/06
[52] U.S. Cl. .................................... 180/9.5; 280/492; 298/20 R; 298/22 J
[58] Field of Search ......................... 180/6.48, 9.4, 9.5; 280/492, 493, 474, 462; 414/483; 298/20 R, 22 R, 22 J

[56] References Cited

U.S. PATENT DOCUMENTS

| | | | |
|---|---|---|---|
| 2,665,144 | 1/1954 | Birdwell | 280/462 |
| 3,658,104 | 4/1972 | Hamilton | 298/20 R |
| 4,036,321 | 7/1977 | Habiger | 180/6.48 |
| 4,072,203 | 2/1978 | Pierson | 180/9.5 X |

*Primary Examiner*—John A. Pekar
*Attorney, Agent, or Firm*—Young & Thompson

[57] ABSTRACT

An articulated, cross-country motor vehicle, especially for forestry work and the transportation of timber, comprising front and back pairs of bogies with belts, pivotally attached to the frame of the vehicle by means of transverse axles or shaft journals. The bogies are independently and/or mutually pivotable and adjustable relative to one another in the vertical plane by means of hydraulic pivoting members controlled from the driver's seat of the vehicle. The vehicle consists of a forward, endless tread vehicle and a trailer provided with a hitch. The two components are releasably coupled together and arranged so as to be mutually universally pivotable relative to one another. The hitch has a lockable joint near the endless tread and a lockable joint at a distance removed from the first mentioned joint, both having horizontal axis of rotation, and adapted in the locked state to keep the hitch rigid and straight and in the unlocked state, to permit the hitch to be bent upwards with the help of suitable tipping means, in order thereby to tip the frame of the trailer backwards about a common axis of pivot for the frame and the rear pair of bogies.

9 Claims, 7 Drawing Figures

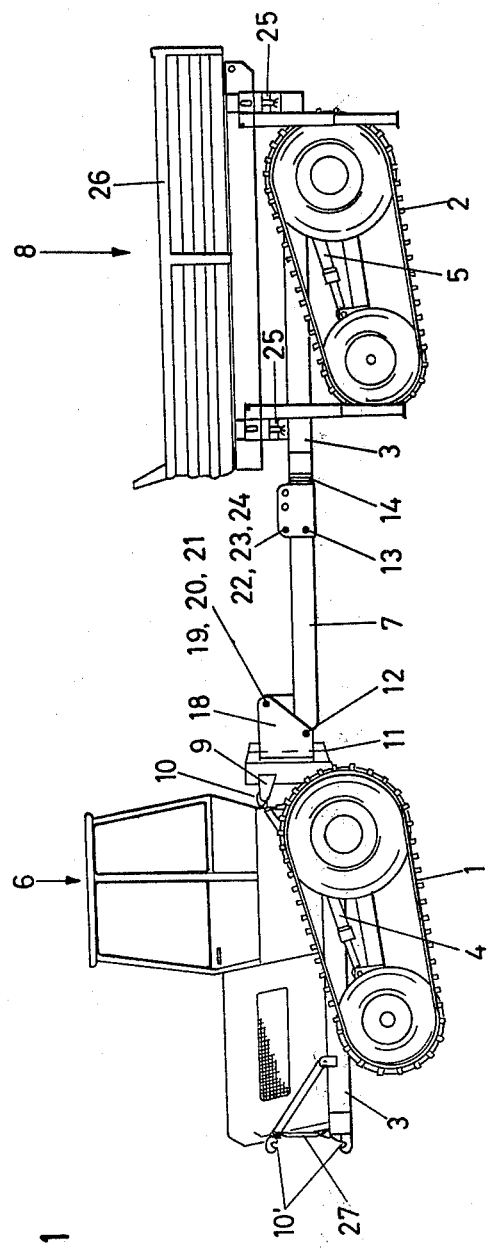
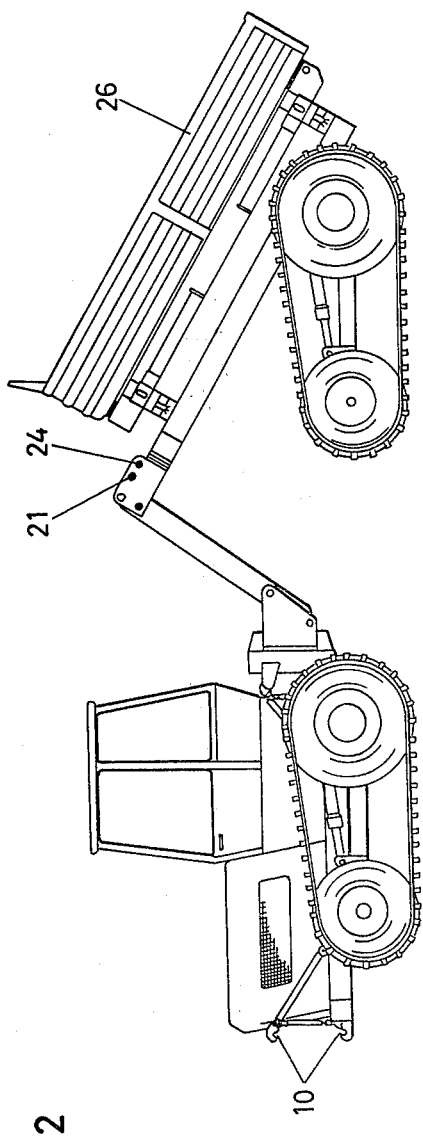
Fig. 1
Fig. 2

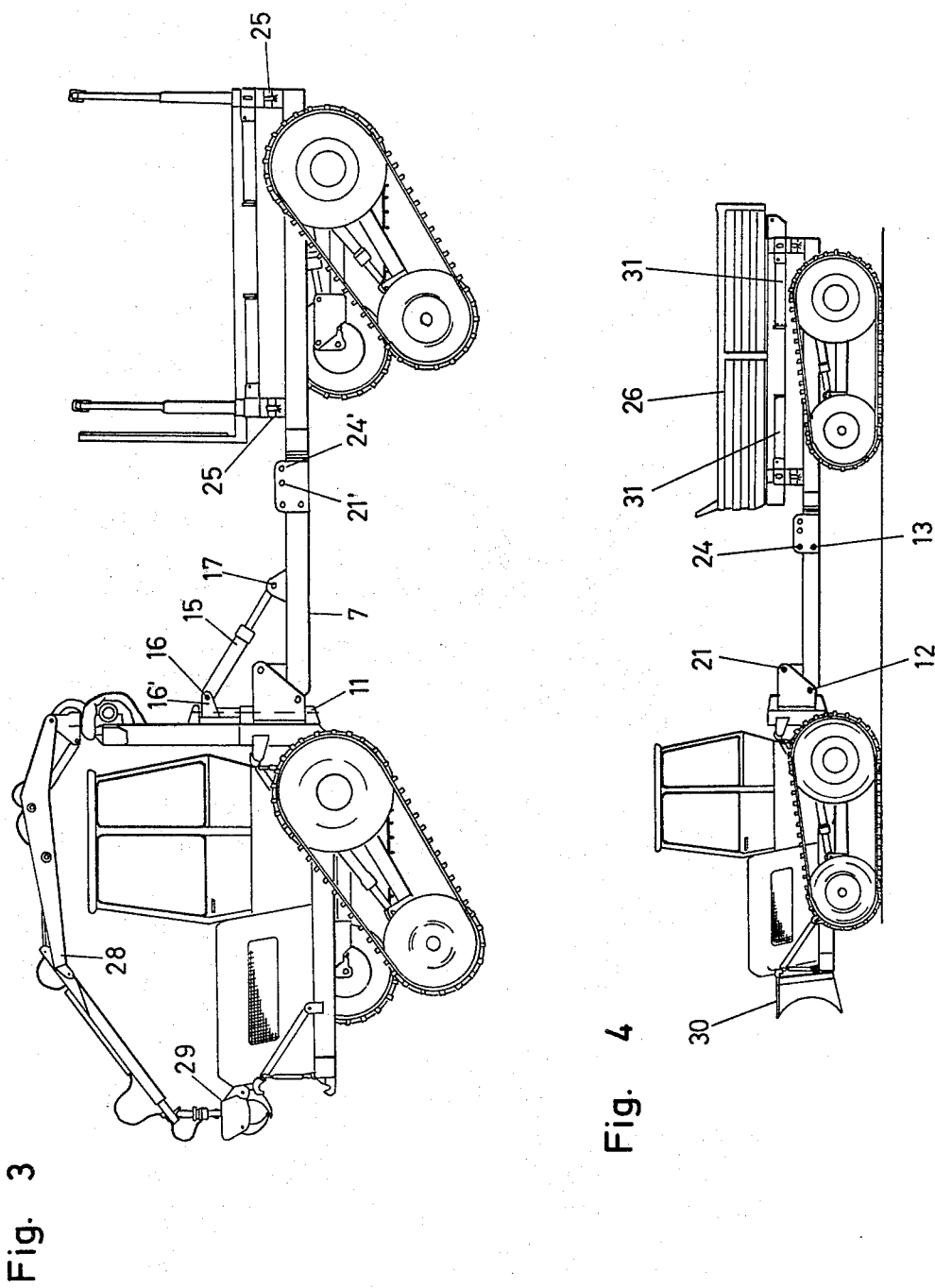

ARTICULATED, CROSS-COUNTRY VEHICLE

The present invention pertains to an articulated, cross country motor vehicle, especially for use in forestry work and the transportation of timber, comprising front and back pairs of bogies with belts, pivotally attached to the frame of the vehicle by means of transverse axles or shaft journals.

A number of different articulated, cross-country motor vehicles of the specified type are known and in use, with different types of equipment mounted on the vehicle, either detachably or permanently, according to the use to which the motor vehicle is to be put. For example, in forestry work, the equipment could comprise a winch for hoisting bundles of logs, or a crane beam for loading timber onto the vehicle; for other applications, the vehicle may be provided with excavating equipment for the performance of various kinds of digging, such as digging ditches, excavating cellars for house foundations, etc.

The various kinds of equipment are usually not adapted to be easily dismantled, and as a result, most of the vehicles so equipped are considered to be special-purpose vehicles suited to the specific area in which they are to operate, such as forestry, excavation or simple transport. In larger plants or operations where the capacity of the various special-purpose machines can be fully utilized, this type of specialization is justifiable. In smaller business or operations, however, such as on a farm where the various tasks will not necessarily be carried out at one time, it would be too costly to procure, e.g., three special machines or specialized vehicles, because their capacities would not be fully utilized.

The purpose of the present invention, therefore, is to provide an articulated, cross-country motor vehicle which, as known per se, is provided with coupling members for the connection of diverse pieces of equipment which have complementary coupling members to permit a rapid and simple attachment and detachment of said equipment, the motor vehicle having very good cross-country driving capability and including a load-carrying rear part on which different pieces of equipment can be attached, such as, for example, a transport bed which can be tipped backwards without the need of any special tipping equipment arranged between the loading bed and the load-carrying part of the vehicle.

The above purpose is achieved by means of the features disclosed in the characterizing clauses of the appurtenant main claim and subsidiary claims.

The invention will be elucidated further in the following with reference to one embodiment of the motor vehicle, as illustrated on the accompanying drawings.

FIG. 1 is a side view of the motor vehicle unit, which comprises a known per se endless tread vehicle coupled to a trailer provided with a hitch, where the bogies on the endless tread have been pivoted downwards somewhat in connection with the off-loading of a detachable loading bed on the trailer.

FIG. 2 shows the same components as FIG. 1, but where the trailer hitch has been bent upwards to tilt the bed of the trailer.

FIG. 3 shows the same components as FIG. 1, but where the bogies on one side have been pivoted down to correct the vehicle's inclination when driving crosswise along the face of a slope.

FIGS. 4–7 show the vehicle, seen from the side, during all phases of the off-loading of a detachable loading bed.

Figure 5:
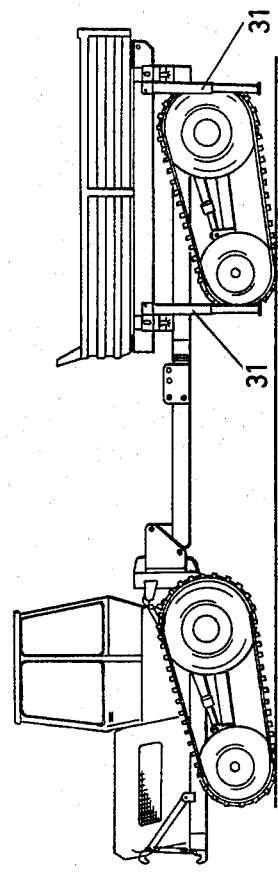
Figure 6:
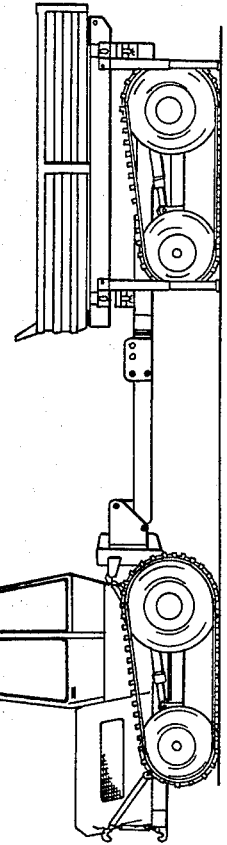

The articulated, cross-country motor vehicle of the invention comprises, as specificially identified with reference numbers on FIG. 1, front and rear pairs of bogies 1, 2 with belts, which are pivotally attached to the frame 3, 3' of the vehicle by means of transverse axles or shaft journals. The bogies 1, 2 are independently and/or mutually pivotable and adjustable relative to one another in the vertical plane by means of hydraulic pressure cylinders 4, 5 controlled from the driver's seat of the vehicle. Hydrostatic drive is provided on the front pair of bogies 1 with belts and preferably also on the rear pair of bogies 2 with belts, which are controlled from the driver's seat of the vehicle by means of known per se steering members. The belts for each pair of bogies can be driven independently of each other, thus permitting the motor vehicle to be steered by pivoting about its joint.

The motor vehicle consists of a forward, known per se endless tread vehicle 6 with the above-mentioned pair of belts/bogies 1 and a rear trailer 8 provided with a hitch 7 and with the above-mentioned pair of belts/bogies 2, the two components being releasably coupled together and arranged so as to be mutually universally pivotable relative to one another, in which the hitch 7 comprises a coupling member 9 at the forward end thereof for cooperation with a complementary coupling member 10 on the endless tread vehicle 6, as well as a first joint 11 with a vertical axis of rotation and a second, lockable joint 12 with a horizontal axis of rotation. In addition, the hitch 7 comprises a third, lockable joint 13 with a horizontal axis of rotation arranged in spaced relation from the second joint 12, adapted in the locked state to keep the hitch 7 in a rigid, straight position and in the unlocked state of both joints 12 and 13 to permit the hitch 7 to be bent upwards by means of the pressure cylinders 5 on the trailer 8, for backwards tilting of the trailer's frame 3' about the common axis of pivot for the frame 3' and the rear pair of bogies 2. In this way, a load carried on a detachable bed 26 on the trailer 8 can be dumped out when the back panel has been knocked down.

In back of the third joint 13 and/or in front of the first joint 11 on the hitch, an axial thrust joint 14 is provided to permit the endless tread vehicle 6 and the trailer 8 to twist relative to each other.

The trailer 8 can also be tilted by means of a pressure cylinder 15 as shown in FIG. 3, one end 16 of which is pivotally attached to a fixed point on the endless tread vehicle at a greater height than the level of the hitch 7, said fixed point being a lug 16' which is pivotable about the vertical axis of rotation for the first joint 11. The other end 17 of the pressure cylinder is pivotal about a horiontal axis of rotation at a point on the hitch 7 between the second and third joints 12, 13. In this manner, the hitch 7 can be bent upwards about the joint 13 by contracting the pressure cylinder 15, and the trailer 8 will then be tipped backwards.

The first and second joints 11, 12 at the forward end of the hitch 7 comprises a bracket 18 supported on the vertical axis of rotation for the first joint 11, and the hitch 7 itself is supported on the horizontal axis of rotation for the second joint 12 in a lower section of the bracket 18, the upper section of the bracket having a locking means which cooperates with a complementary locking means on the hitch 7. This locking device consists of aligned holes 19, 20 in the bracket 18 and the hitch 7 and a bolt 21 for insertion through the flush holes to lock the joint 12.

The third, lockable joint 13 on the hitch 7 has a locking means spaced a distance from its horizontal axis of rotation and comprising aligned holes 22, 23 in the two hitch parts and a bolt 24 for insertion through said holes to lock the joint.

At a suitable location on the hitch, for example, in connection with the joint 13, two holes 21 and 24' (FIG. 3) can be provided to hold and store the bolts 21 and 24 when they are not in use as locking bolts in their respective joints 12 and 13.

As can be seen in the drawings, the trailer 8 is provided with coupling members 25 for cooperation with complementary coupling members on the detachable bed 26 or on other equipment which is to be coupled onto the trailer, e.g., a loading frame for logs, a transport container for concrete or a cement mixing apparatus, etc. The endless tread vehicle 6 itself, as mentioned previously, is provided with a coupling member 10 at the rearward end thereof for cooperation with a coupling member 9 at the forward end of the hitch 7 on the trailer 8. A corresponding coupling member 10' is provided at the front end of the vehicle 6 and comprises (FIG. 1) two pairs of facing claws, the lower part of claws being attached to the forward portion of the frame 3 for the vehicle 6, while each claw in the upper pair is attached to the end of an arm which in turn is pivotally attached to the frame 3 in spaced relation from the lower pair of claws. Between the upper and lower claws, a turnbuckle is attached for drawing the claws together about the complementary coupling member 9' which may optionally be guided in between the claws and held securely thereby. The back coupling member 10 on the vehicle 6, which is partially hidden behind the bogie 1, is constructed in the same manner. By means of the coupling members 10 and 10', the trailer 8 and optional front-mounted equipment on the vehicle 6, respectively, can easily be coupled to or uncoupled from the vehicle, thus freeing it for use alone for various purposes. The vehicle 6, as shown on FIG. 3, for example, can also be provided with a hoisting crane on the coupling member 10. Similarly, an excavator can also be coupled to the endless tread vehicle in the same way. If, for example, the hoisting crane 28 shown in FIG. 3 is provided with a gripping member for timber, the crane can be utilized to load timber on the optionally coupled trailer provided with frames for the logs, and it could also be used for introducing logs into a de-barking/lopping machine which could be attached to the front of the vehicle 6 by means of the coupling member 10'.

Furthermore, the vehicle 6 could be provided with a front-mounted blade 30 as shown on FIG. 4, which can be raised and lowered by pivoting the frame 3 itself up and down by means of the pressure cylinders 4, 5 for the pair of bogies 1. In the same manner, a snowplow could be mounted and raised/lowered to the desired working position.

Figure 7:
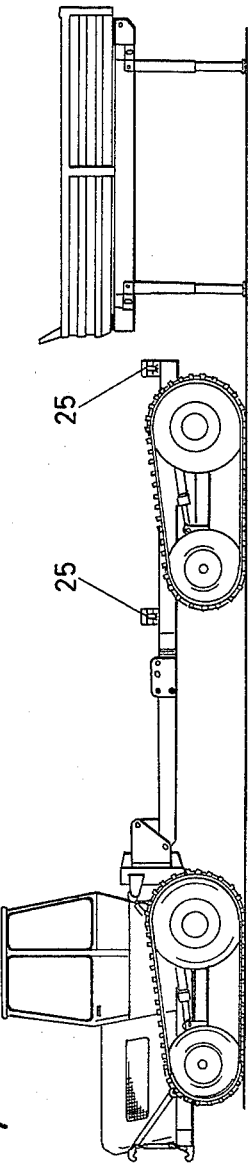

FIGS. 4-7 show how the detachable bed 26 provided with telescopically extensible drop legs 31 is detached from the trailer 8. First, the vehicle is raised up by means of the bogie pairs 1, 2, which are pivoted downwards about the pivot points at the rear wheels, and the joints 12 and 13 on the hitch 7 are locked by means of the locking bolts 21, 24 as shown in FIG. 4. The telescopically extensible legs 31 are then swung down and locked in the extended position (FIG. 5). Following this, the vehicle is lowered by pivoting the bogies 1, 2 into the normal position, bringing the trailer 8 frame 3' with its coupling members 25 away from contact with the detachable bed 26 such that the vehicle can be driven freely away from the detachable bed as shown in FIG. 7. When the bed is to be loaded onto the trailer, the above operations are performed in the opposite sequence.

The articulated, cross-country motor vehicle of the invention has a very good ability to make its way in difficult terrain because, owing to the pivotable pairs of bogies 1 and 2, the forward or rear parts of the vehicle can be raised or lowered as desired, as can one or the other side of the vehicle, for example, when driving across the face of a slope, as mentioned above and as shown in FIG. 3. In the latter case, the joints 12 and 13 in the hitch 7 must be locked in place as shown in FIGS. 1, 3 and 4-7. Then, for example, if one of the bogies should become stuck in a hole, one can free the vehicle by pivoting the bogie in question down, thereby raising the relevant section of the vehicle free of the ground; subsequently, the drive power of the bogies is coupled in as one attempts to drive on, and the downwardly-pivoted bogie climbs out of the hole.

Should this operation be unsuccessful, it is possible, by means of said downward pivoting of the bogie, to lift the rear part of the bogie such that tree trunks, for example, can be placed beneath the bogie. Then, pivoting the bogie up into a normal driving position, or up above the normal position, one can place additional tree trunks or material beneath the forward part of the bogie, i.e. the ditch or hole beneath the bogie can be filled in. When this has been done, the bogie is lowered into the normal driving position and the vehicle drives over the now-leveled ditch or hole.

By pivoting both pairs of bogies 1 and 2 all the way down by means of the pressure cylinders 4, 5, the vehicle can be raised such that its height above the ground is about 1.5 meters, i.e., more than twice its normal clearance with the bogies in the normal driving position. Raised to this position, the vehicle is able to force its way over very high obstacles such as stones, tall tree stumps, etc.

The vehicle of the invention can naturally also be built with bogies which are pivotable about a point nearer the middle of the expanse between front and back wheel, as opposed to the bogie shown in the drawings, which is pivotable about the back wheel. One then obtains all of the advantages mentioned above, with the exception of the very high clearance from the ground that is obtained with the embodiment shown in the figures, an advantage which can be very important if the vehicle is to work under very rugged conditions.

Owing to the rigid coupling of the vehicle 6 to the trailer 8, i.e., with the joint 12 locked, the vehicle is prevented from rearing up when driving up a slope with a heavy load on the trailer. If one desires to cushion the movement between the vehicle 6 and the trailer 8, a pressure cylinder 15 as shown on FIG. 3 can be used. In this case, the joint 12 is released by withdrawing the locking bolt 21, and the pressure cylinder 15 can either be freely coupled that the vehicle 6 and the trailer can move freely relative to one another, or the cylinder 15 can be locked by supplying pressure on both sides of the piston to hold the vehicle 6 and the trailer 8 in the desired relative positions.

In normal driving in rugged terrain, the hitch 7 is rigid, i.e., the joints 12 and 13 are locked by means of the locking bolts 21 and 24. The bogies' pressure cylinders 4 and 5 are also coupled such that the bogies can swing freely relative to one another. The pressure cylinders in a pair of bogies can also optionally be coupled such that an upswing of one bogie causes the other bogie to swing down, so that the vehicle is prevented insofar as is possible from tipping to one side or the other when passng over rises or recesses in the ground.

The hydrostatic drive machinery, its positioning in the bogies, and the control of the drive machinery and the pressure cylinders for the bogies are not a part of the invention, and can be carried out in any suitable and known per se manner.

Having described my invention, I claim:

1. An articulated, cross-country motor vehicle, especially for forestry work and the transportation of timber, comprising front and back pairs of bogies with belts, pivotally attached to the vehicle by means of transverse axles or shaft journals, wherein the bogies are independently and/or mutually pivotable and adjustable relative to one another in the vertical plane by means of hydraulic members, comprising a forward endless tread vehicle and a trailer having a hitch, the endless tread vehicle and the trailer being releasably coupled together and arranged so as to be mutually universally pivotable relative to one another, a coupling member at the forward end of the hitch for cooperation with a complementary coupling member on the endless tread vehicle; the hitch also having a first joint with a vertical axis of rotation and a second, lockable joint with a horizontal axis of rotation adapted in the locked state to hold the hitch in a position perpendicular to the vertical axis of rotation for the first joint; and a third, lockable joint with a horizontal axis of rotation positioned in the hitch at a distance removed from the second joint, adapted in the locked state to keep the hitch rigid and straight and in the unlocked state, together with said second joint, to permit the hitch to be bent upwards with the help of tipping means, in order thereby to tip the frame of the trailer backwards about a common axis of pivot from the frame and the rear pair of bogies; and axial thrust joints in the hitch on the sides of the first or third joints that are remote from each other.

2. An articulated, cross-country motor vehicle according to claim 1, characterized in that said means for backwards tilting comprises a hydraulic cylinder, one end of which is mounted so as to be universally pivotal about a fixed point on the endless tread vehicle located at a higher elevation than the hitch, the universal pivot point for said cylinder being aligned with the vertical axis of pivot for the first joint, and the other end of said cylinder being pivotally mounted about a horizontal axis of pivot at a point on the hitch located between the second and third joints.

3. An articulated, cross-country motor vehicle according to claim 1, characterized in that the first and second joints include a bracket supported about the vertical axis of rotation for the first joint, and that the hitch is supported about the horizontal axis of rotation for the second joint in a lower section of the bracket, an upper section of said bracket having a locking means for cooperation with a complementary locking means on the hitch.

4. An articulated, cross-country motor vehicle according to claim 3, characterized in that the locking means comprises aligned holes in the bracket and in the hitch and a bolt for insertion through the aligned holes for locking the joint.

5. An articulated, cross country motor vehicle according to claim 1, characterized in that the third joint has a locking means spaced a distance from its horizontal axis of rotation for fixing the third joint in the locked position.

6. An articulated, cross-country motor vehicle according to claim 5, characterized in that said locking means comprises aligned holes in the hitch and a bolt for insertion therethrough for locking the joint.

7. An articulated, cross-country motor vehicle according to claim 1, characterized in that the trailer has coupling members for the attachment of diverse equipment having complementary coupling members.

8. An articulated, cross-country motor vehicle according to claim 1, characterized in that the pair of bogies on the endless tread vehicle have hydrostatic drive means.

9. An articulated, cross-country motor vehicle according to claim 1, characterized in that the pair of bogies on the trailer have hydrostatic drive means.

* * * * *